United States Patent
Méndez Díaz et al.

(10) Patent No.: US 10,443,623 B2
(45) Date of Patent: Oct. 15, 2019

(54) HEAT EXCHANGER OUTLET DEFLECTOR

(71) Applicants: AIRBUS OPERATIONS S.L., Getafe (ES); Airbus Operations GmbH, Hamburg (DE)

(72) Inventors: Antón Méndez Díaz, Getafe (ES); Javier Fraile Martin, Getafe (ES); Neus Busquets More, Getafe (ES); Jan Barkowsky, Hamburg (DE)

(73) Assignees: AIRBUS OPERATIONS S.L., Getafe (ES); AIRBUS OPERATIONS GMBH, Hamburg (DE)

( * ) Notice: Subject to any disclaimer, the term of this patent is extended or adjusted under 35 U.S.C. 154(b) by 178 days.

(21) Appl. No.: 15/458,688

(22) Filed: Mar. 14, 2017

(65) Prior Publication Data

US 2017/0268533 A1   Sep. 21, 2017

(30) Foreign Application Priority Data

Mar. 15, 2016  (EP) .................................. 16382115

(51) Int. Cl.
  *F04D 29/58* (2006.01)
  *B64D 15/04* (2006.01)
  (Continued)

(52) U.S. Cl.
  CPC .......... *F04D 29/582* (2013.01); *B64D 13/08* (2013.01); *B64D 15/04* (2013.01); *F02C 6/08* (2013.01);
  (Continued)

(58) Field of Classification Search
  None
  See application file for complete search history.

(56) References Cited

U.S. PATENT DOCUMENTS

| | | | | |
|---|---|---|---|---|
| 3,925,022 A | * | 12/1975 | Showalter | G01N 33/0045 422/88 |
| 4,706,644 A | * | 11/1987 | Nakai | B60H 1/032 122/20 B |
| 5,214,935 A | | 6/1993 | Brunskill | |
| 5,316,568 A | * | 5/1994 | Brown | B01D 53/22 55/465 |

(Continued)

FOREIGN PATENT DOCUMENTS

| | | |
|---|---|---|
| EP | 2479108 | 7/2012 |
| EP | 2687808 A1 | 1/2014 |

OTHER PUBLICATIONS

European Search Report, dated Sep. 19, 2016, priority document.
Andreas Ruch, "Static Air Mixer Optimization with Star-CCM+ and Optimate+" published Mar. 2016.

*Primary Examiner* — Michael Lebentritt
(74) *Attorney, Agent, or Firm* — Greer, Burns & Crain, Ltd.

(57) ABSTRACT

An engine bleed air system of an aircraft, comprising a heat exchanger which comprises a rectangular core with a rectangular outlet section, a cylindrical outlet duct and a transition area between the rectangular outlet section of the rectangular core and the cylindrical outlet duct, and at least a downstream system, further comprising a flow deflector located at least in the cylindrical outlet duct, such that the outlet flow characteristics homogeneity are improved and a particular flow deflection and distribution of the outlet flow is achieved, avoiding the damage of the at least one downstream system. The invention also provides a method for homogenizing the temperature of the outlet flow of a heat exchanger outlet in an engine bleed air system of an aircraft.

14 Claims, 5 Drawing Sheets

(51) Int. Cl.
    *F04D 27/00*     (2006.01)
    *F04D 29/54*     (2006.01)
    *F04D 29/56*     (2006.01)
    *B64D 13/08*     (2006.01)
    *F02C 6/08*     (2006.01)
    *F02C 9/18*     (2006.01)
    *B64D 13/06*     (2006.01)

(52) U.S. Cl.
    CPC .............. *F02C 9/18* (2013.01); *F04D 27/009* (2013.01); *F04D 29/542* (2013.01); *F04D 29/545* (2013.01); *F04D 29/563* (2013.01); *B64D 2013/0618* (2013.01); *F05D 2260/213* (2013.01)

(56) References Cited

U.S. PATENT DOCUMENTS

| | | | | |
|---|---|---|---|---|
| 5,419,388 | A * | 5/1995 | Hickel | F28D 17/02 |
| | | | | 165/236 |
| 6,729,306 | B2 * | 5/2004 | Koegler, III | F02M 37/08 |
| | | | | 123/497 |
| 7,059,537 | B2 * | 6/2006 | Parker | B60H 1/00264 |
| | | | | 165/41 |
| 7,270,098 | B2 * | 9/2007 | Young | B60H 1/2206 |
| | | | | 123/142.5 R |
| 9,068,499 | B2 * | 6/2015 | Thayer | F02B 37/00 |
| 2002/0121103 | A1 | 9/2002 | Udobot et al. | |
| 2011/0061609 | A1 * | 3/2011 | Van Wyk | F23L 7/002 |
| | | | | 122/14.22 |
| 2012/0186282 | A1 | 7/2012 | Army et al. | |
| 2016/0305586 | A1 * | 10/2016 | Graham | F16L 15/08 |
| 2018/0259223 | A1 * | 9/2018 | Reed | F24H 9/2085 |

* cited by examiner

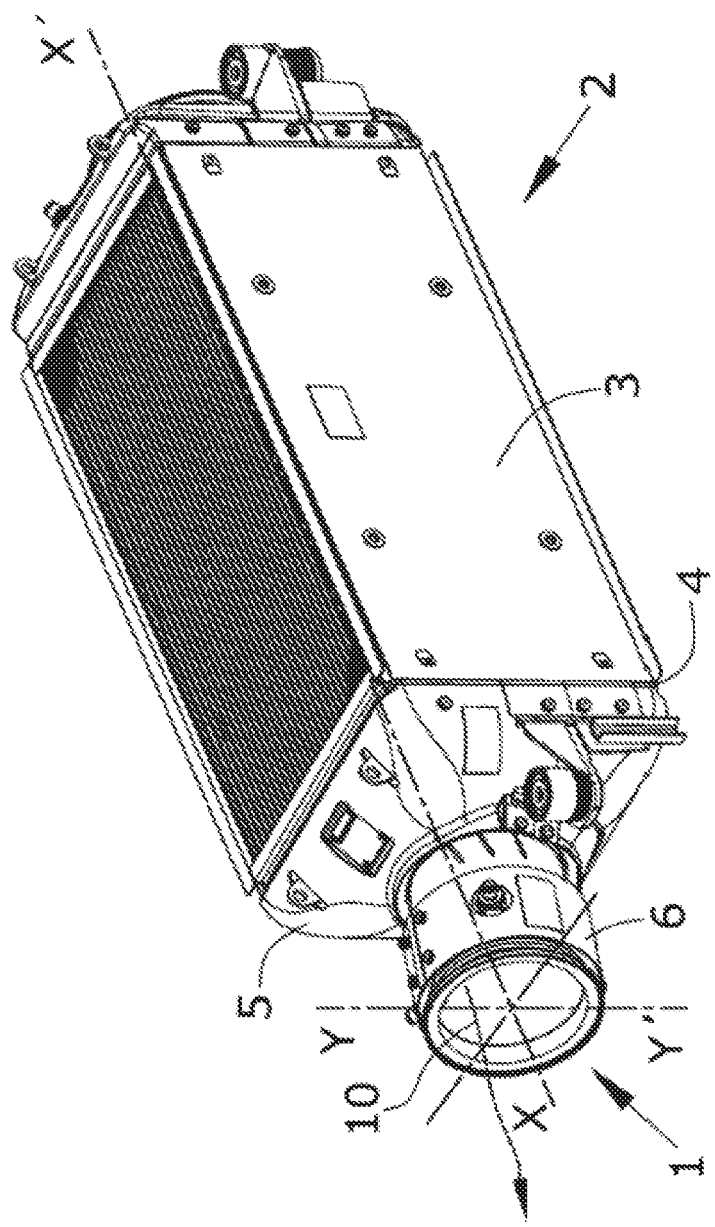

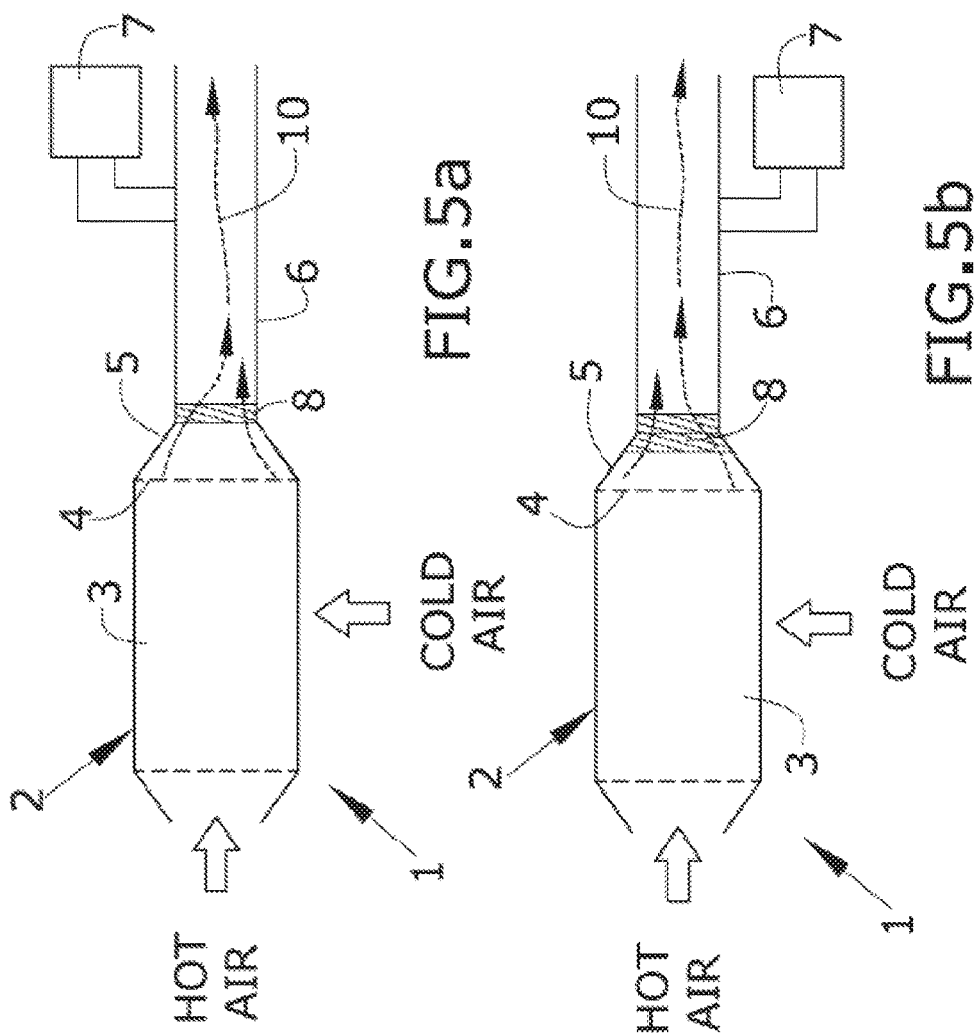

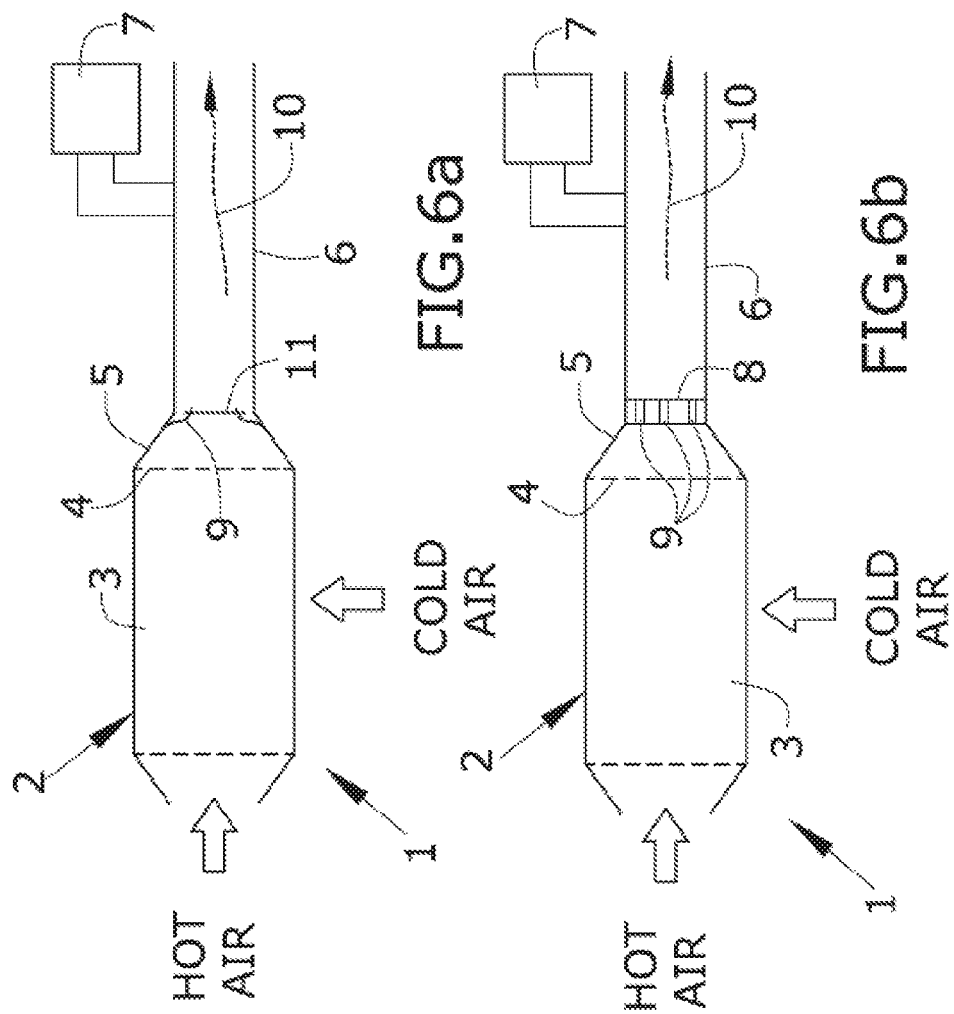

HEAT EXCHANGER OUTLET DEFLECTOR

CROSS-REFERENCES TO RELATED APPLICATIONS

This application claims the benefit of the European patent application No. 16382115.0 filed on Mar. 15, 2016, the entire disclosures of which are incorporated herein by way of reference.

TECHNICAL FIELD OF THE INVENTION

The present invention belongs to the field of homogenization and direction control of air flow, in particular to the field of homogenizing and deflecting the air flow at the outlet of a heat exchanger in an engine bleed air system. More specifically, the invention is of special application in the aeronautic industry.

BACKGROUND OF THE INVENTION

Heat exchangers used as part of the engine bleed air system comprise bundles of tubes housed in a casing, wherein a first flow of coolant fluid is generated in the space existing between the tubes and wherein a second flow of hot air flows through the tubes.

The heat exchangers, which are normally very voluminous, are usually installed in areas of limited available space, such as the pylon or nacelle of an aircraft. This is a drawback in the aeronautic industry which is constantly seeking to achieve smaller and lighter components.

Therefore, a different type of heat exchanger is used in order to solve the problem of space. These heat exchangers are fins and plates type, which also improve the thermal efficiency per volume, but as a drawback provide a higher stratification of the flow characteristics at their outlet. The hot air obtained from the heat exchanger is a stratified flow, not only thermally but also for different flow properties, which can damage different downstream systems in fluid communication with the heat exchanger.

These downstream systems require an incident homogeneous flow and adequate temperatures, so both a high stratification and extreme temperatures can damage them and impact in their performance.

SUMMARY OF THE INVENTION

The present invention provides an alternative solution for the aforementioned problems, by an engine bleed air system and a method for homogenizing the temperature of the outlet flow of a heat exchanger.

In a first inventive aspect, the invention provides an engine bleed air system of an aircraft, comprising:
a heat exchanger comprising a:
rectangular core with a rectangular outlet section,
cylindrical outlet duct, and
transition area between the rectangular outlet section of the rectangular core and the cylindrical outlet duct, and
at least a downstream system in fluid communication with the heat exchanger,
wherein the engine bleed air system further comprises a flow deflector located at least in the cylindrical outlet duct, such that the outlet flow characteristics homogeneity are improved and a particular flow deflection and distribution of the outlet flow is achieved, avoiding the damage of the at least one downstream system.

Throughout this document, "an outlet flow" is to be considered a fluid flow exiting the heat exchanger, and passing through, and therefore being modified by the flow deflector.

A heat exchanger comprising the flow deflector improves the homogeneity of the outlet flow concerning different flow characteristics, particularly the temperature or density, which vary in different points of the outlet flow. Additionally, the flow deflector directs the outlet flow in order to avoid the damage of any downstream system.

The flow deflector is located at least occupying an area of the cylindrical outlet duct, in order to obtain sufficient deflection of the outlet flow.

Placing the flow deflector in the cylindrical outlet duct advantageously allows the outlet flow to be concentrated before its deflection, thus being uniformly distributed towards the inlet of the flow deflector.

In a particular embodiment, the flow deflector of the engine bleed air system comprises at least two blades.

Advantageously, a flow deflector formed by different blades located on the outlet of the heat exchanger provides an important homogenization of the flow characteristics, particularly the temperature. Thus, the temperature stratification of the fluid flow is reduced which allows a more reliable temperature measurement by means of a temperature sensor located downstream the heat exchanger. This measurement is then used to control and regulate the temperature of the flow in a more efficient manner within a closed control loop.

Having at least two blades in the flow deflector allows the deflection of the outer layers, upper or bottom layers depending on the position of the flow deflector, of the outlet flow towards the center or opposite outer layer of the flow. The upper or bottom layers are the ones where the flow conditions are more extreme, therefore the flow deflector will be placed in a position that is optimal for acting on the layers.

In a particular embodiment, the flow deflector of the engine bleed air system comprises at least four blades.

In a particular embodiment, at least one of the blades of the flow deflector of the engine bleed air system forms an angle of attack with a direction X-X' or direction of the outlet flow.

At least one blade is located such that it affects the flow by means of an oblique incidence, defined by the angle of attack of the blade with the direction X-X', which is longitudinal. This allows the deflection and mixing of the different layers of the flow, by introducing turbulence causing swirl.

The blade deflects the hot flow obtained at the outlet of the heat exchanger in such a way that the outlet flow is directed following a path opposite to the location of any downstream system, therefore remaining protected from receiving a flow of extreme conditions.

Moreover, a flow deflecting mean as presented produces a low extra pressure drop on the system, thus improving homogenization of the flow without such an important drawback as any other known possible solutions which may increase the pressure drop in the outlet flow.

In a particular embodiment, at least one of the blades of the flow deflector of the engine bleed air system is parallel or perpendicular to a direction X-X' or direction of the outlet flow.

In a particular embodiment, the blades of the flow deflector of the engine bleed air system location extend towards the transition area.

This allows a homogenization of the outlet flow from a previous point of the outlet of the heat exchanger. The deflection of the outer layers, top and bottom layers of the outlet flow, is also achieved in a previous point of the path of the outlet flow.

In a particular embodiment, at least one blade of the flow deflector of the engine bleed air system is curved.

A curved blade allows the outlet flow to collide with a curved surface, so it is deflected in the correct direction.

In a particular embodiment, the blades of the flow deflector of the engine bleed air system are located so that they form a grid.

The grid is formed by a plurality of blades that are located forming a pattern. The blades can be oriented with any angle with respect to the outlet flow, and the grid is formed by the location of the blades in two different directions, preferably parallel and perpendicular to the outlet flow, forming 90° angles between different blades.

Advantageously, the formation of a grid allows the outlet flow to be deflected in the correct direction.

In a particular embodiment, at least one blade of the flow deflector of the engine bleed air system is an aerodynamic profile.

Throughout this document, "aerodynamic profile" will be understood as the shape of the blade which comprises at least part of its section as a curved section so that the outlet flow collides with the curvature thus being deflected in the correct direction.

In a particular embodiment, all the blades of the flow deflector of the engine bleed air system have the same aerodynamic profile, therefore uniformly deflecting the outlet flow.

In a particular embodiment, the blades of the flow deflector of the engine bleed air system are fixed on one end to a central ring, coaxial with the cylindrical outlet duct.

Advantageously, the central ring provides an additional surface of deflection, providing deflection also of the middle layers of the outlet flow.

In a particular embodiment, at least some of the blades of the flow deflector of the engine bleed air system are fixed on the perimeter of the cylindrical outlet duct.

Advantageously, the flow deflector is fixed in its position by connecting at least one blade to the outer perimeter of the cylindrical outlet duct.

In a particular embodiment, the blades of the flow deflector of the engine bleed air system can also be fixed to at least another blade.

In a particular embodiment, the blades of the flow deflector of the engine bleed air system are adjustable, varying the angle of attack.

Advantageously, the blades can be adjusted in position in order to obtain a different turbulence or flowing path on the outlet flow depending on the temperature conditions of the flow when exiting the heat exchanger or on the downstream systems location.

In a particular embodiment, the blades of the flow deflector have a variable angle of attack along the cylindrical outlet duct section.

In a particular embodiment, the flow deflector is an air flow deflector.

The air flow deflector ensures a desired temperature distribution of the air flow which is afterwards used in a system needing an air feeding, particularly a wing anti ice system of an aircraft.

In a particular embodiment, the air flow deflector, which allows the deflection of the hottest layers of air exiting the heat exchanger away from downstream sensitive systems, deflects such mentioned hottest layers of air away from a wing anti ice system.

In a particular embodiment, the flow deflection means comprise at least one metallic blade.

A metallic blade allows a better resistance to the extreme conditions of the outlet flow.

In a second inventive aspect, the invention provides a method for homogenizing the temperature of the outlet flow of a heat exchanger outlet in an engine bleed air system of an aircraft, the method comprising the step of:

providing an flow deflector according to the first inventive aspect for acting on the outlet flow, locating the flow deflector at least in the cylindrical outlet duct.

Advantageously, the method provides a homogeneous outlet flow with a low additional pressure drop.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

FIG. 4 shows the outlet section of a heat exchanger where the flow deflection means according to one embodiment of the invention is installed.

FIG. 5a shows the position of the flow deflector according to one embodiment of the invention in the engine bleed air system.

FIG. 5b shows the position of the flow deflector according to another embodiment of the invention in the engine bleed air system.

FIG. 6a shows the position of the flow deflector according to another embodiment of the invention in the engine bleed air system.

FIG. 6b shows the position of the flow deflector according to another embodiment of the invention in the engine bleed air system.

DETAILED DESCRIPTION OF THE PREFERRED EMBODIMENTS

Figure 1A:
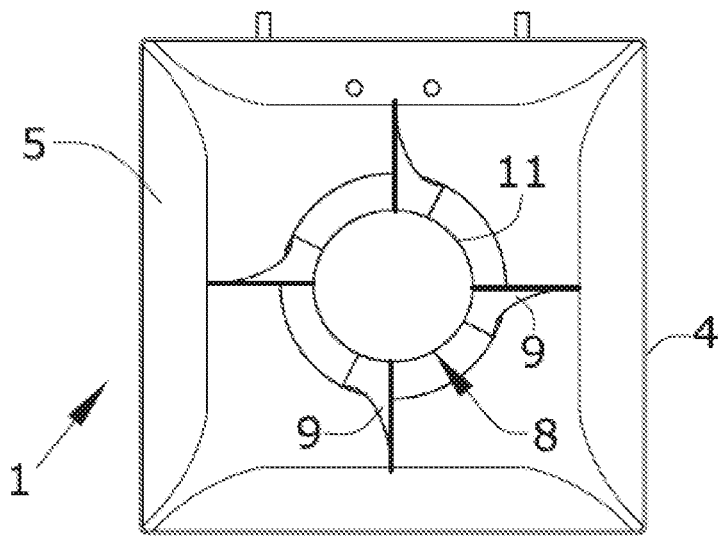
Figure 1A shows an elevation view, shown from the inside of the heat exchanger, of the position of the blades of the flow deflection means according to one embodiment of the invention.

FIG. 4 shows a general view in perspective of a heat exchanger (2) of the invention, particularly the rectangular core (3) with its rectangular outlet section (4), the transition area (5) and the cylindrical outlet duct (6), wherein the flow deflector (8) is to be located.

Figure 1B:
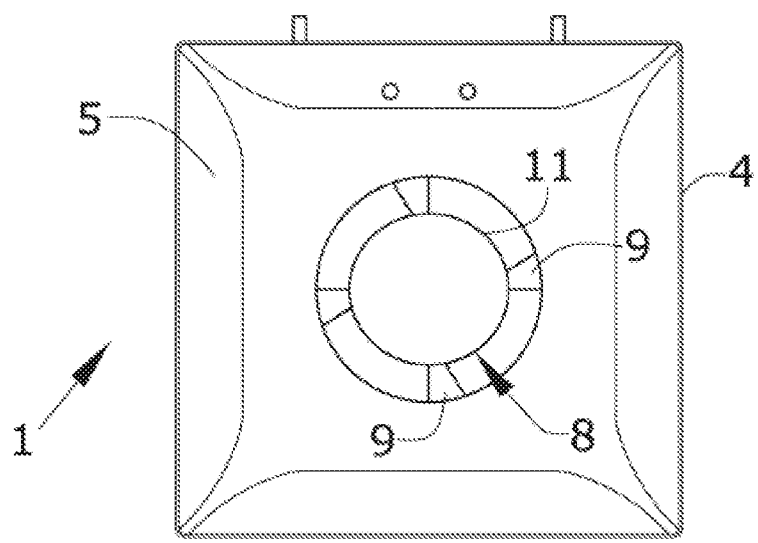
FIG. 1B shows an elevation view, shown from the inside of the heat exchanger, of the position of the blades of the flow deflection means according to another embodiment the invention.

Starting from such general configuration of the invention, figures 1A and 1B show elevation views of preferred embodiments of the invention, wherein the rectangular outlet section (4) and the transition area (5) of the heat exchanger (2) are depicted. The flow deflector (8) is also shown, which comprises a central ring (11), which is coaxial with the cylindrical outlet duct (6), shown in both figures. A set of blades (9), four in both cases, are joined to the central ring (11) and to the heat exchanger (2).

FIG. 1A shows four blades (9) located both on the cylindrical outlet duct (6) and extending into de transition area (5). The blades (9) are fixed radially to the central ring (11), and are straight blades (9). In an alternative embodiment, the blades (9) are curved blades.

FIG. 1B shows four blades (9) located only on the cylindrical outlet duct (6), and fixed radially to the central ring (11). The blades (9) are straight. In an alternative embodiment, the blades (9) are curved blades.

Figure 2:
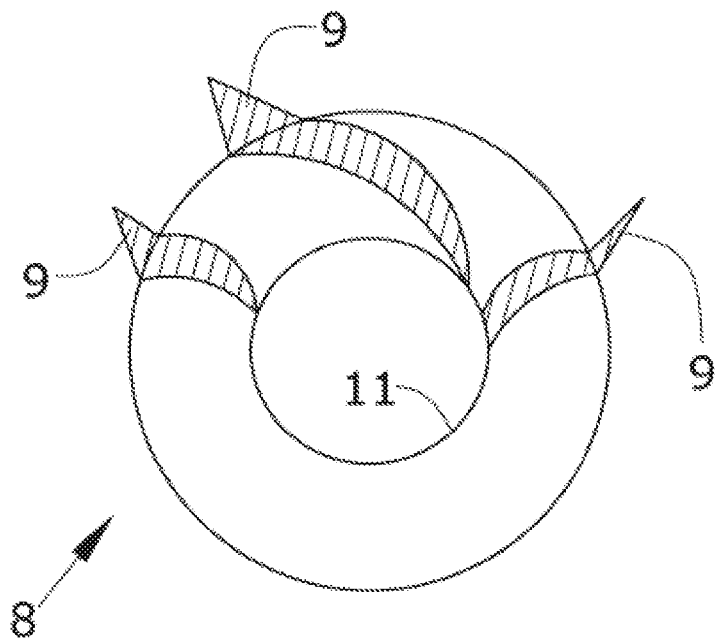
FIG. 2 shows the position of the blades of the flow deflection means according to another embodiment the invention.

FIG. 2 shows an embodiment of the flow deflector (8) comprising three blades (9) which are arranged such that they are placed on the upper part of the central ring (11) and fixed to it. The blades (9) are preferably curved. In an alternative embodiment, the blades (9) are straight blades.

In this embodiment the flow deflector (8) is preferably located both on the cylindrical outlet duct (6) and extending into de transition area (5). In an alternative embodiment, the flow deflector (8) is located only on the cylindrical outlet duct (6).

Figure 3:
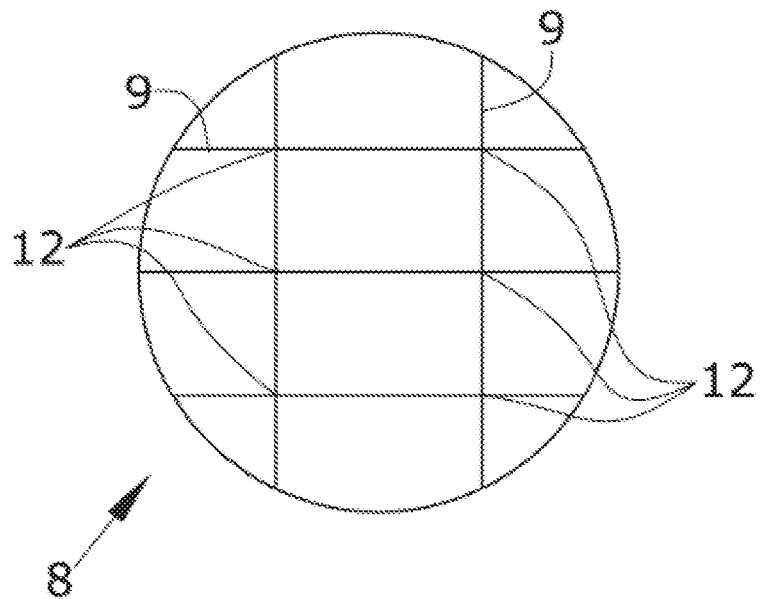
FIG. 3 shows the position of the blades of the flow deflection means according to another embodiment the invention.

FIG. 3 shows an embodiment of the flow deflector (8) comprising five blades (9). There are two blades (9) arranged in a vertical position, while three blades (9) are located in a horizontal position, forming the whole set of blades (9) a grid.

All the blades (9) are fixed by their ends to the internal contour of the cylindrical outlet duct (6), while each blade (9) is intermediately fixed to the blades (9) arranged in its opposite direction in fixing points (12).

The flow deflector (8) is located in the cylindrical outlet duct (6).

As already mentioned, FIG. 4 shows a perspective view of a heat exchanger (2), particularly the rectangular core (3) with its rectangular outlet section (4) and the transition area (5).

The cylindrical outlet duct (6) is also shown, where the blades (9) of the flow deflector (8) of the aforementioned FIGS. (1A-3) are to be located.

The heat exchanger (2) establishes a longitudinal direction, the X-X' direction, according to which the hot air inlet and the hot air outlet flow (10) pass through the heat exchanger (2). There is also a Y-Y' direction established, perpendicular to the X-X' direction, which is the perpendicular direction followed by the blades (9) of the embodiment of FIG. 3.

FIG. 5a shows a position of the flow deflector (8) in the engine bleed air system (1). The heat exchanger (2) has two inlets, a hot air inlet from the engine core compressor and a cold air inlet from the fan secondary flow, and an outlet air flow (10) exiting the heat exchanger (2) through the cylindrical outlet duct (6). There is a second flow outlet which releases the cooling flow to the atmosphere without impacting the rest of the system (not shown in the figures). The flow deflector (8) is located on the cylindrical outlet duct (6), and allows the outlet air flow (10) to be directed opposite to the downstream systems (7) and to be homogenized.

FIG. 5b shows another position of the flow deflector (8) in the engine bleed air system (1). The flow deflector (8) is partly located in this embodiment in the cylindrical outlet duct (6), and partly extending inside the transition area (5), which may improve the deflecting and homogenizing properties of this device. Furthermore, in this embodiment the flow deflector (8) is designed such that the outlet air flow (10) is directed in a different direction according to the different locations of the downstream systems (7).

FIG. 6a shows the position of the flow deflector (8) in the engine bleed air system (1), located in the cylindrical outlet duct (6) and partly extending inside the transition area (5). The blades (9) are fixed to a central ring (11) of the flow deflector (8). The outlet air flow (10) is directed opposite to the downstream systems (7) and homogenized.

FIG. 6b shows the position of the flow deflector (8) in the engine bleed air system (1), located only in the cylindrical outlet duct (6). As shown in FIG. 3, the blades (9) are fixed to the inner contour of the cylindrical outlet duct (6), in the horizontal and vertical directions according to the direction of the FIG. 3. The outlet air flow (10) is directed opposite to the downstream systems (7) and homogenized.

According to FIGS. 5a, 5b, 6a and 6b, the downstream systems can be located both on the upper and/or lower part of the cylindrical outlet duct (6), according to the X-X' direction of the heat exchanger (2).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An engine bleed air system of an aircraft, comprising:
a heat exchanger comprising:
a rectangular core with a rectangular outlet section,
a cylindrical outlet duct,
a transition area between the rectangular outlet section of the rectangular core and the cylindrical outlet duct, and
at least a downstream system in fluid communication with the heat exchanger,
wherein the engine bleed air system further comprises a flow deflector located at least in the cylindrical outlet duct, such that the outlet flow characteristics homogeneity are improved and a particular flow deflection and distribution of said outlet flow is achieved, avoiding the damage of the at least one downstream system.

2. The engine bleed air system of an aircraft according to claim 1 wherein the flow deflector comprises at least two blades.

3. The engine bleed air system of an aircraft according to claim 1 wherein the flow deflector comprises at least four blades.

4. The engine bleed air system of an aircraft according to claim 2 wherein at least one of the blades forms an angle of attack with a longitudinal direction of the rectangular core or a direction of the outlet flow.

5. The engine bleed air system of an aircraft according to claim 2 wherein at least one of the blades is parallel or perpendicular to a longitudinal direction of the rectangular core or a direction of the outlet flow.

6. The engine bleed air system of an aircraft according to claim 2 wherein the blades location extends towards the transition area.

7. The engine bleed air system of an aircraft according to claim 2, wherein at least one blade is curved.

8. The engine bleed air system of an aircraft according to claim 3 wherein the blades are located so that they form a grid.

9. The engine bleed air system of an aircraft according to claim 2 wherein at least one blade is an aerodynamic profile.

10. The engine bleed air system of an aircraft according to claim 2, wherein the blades are fixed on one end to a central ring, coaxial with the cylindrical outlet duct.

11. The engine bleed air system of an aircraft according to claim 3, wherein at least some of the blades are fixed on the perimeter of the cylindrical outlet duct.

12. The engine bleed air system of an aircraft according to claim 2 wherein the blades are adjustable, varying the angle of attack.

13. The engine bleed air system of an aircraft according to claim 2 wherein the blades have a variable angle of attack along the cylindrical outlet duct section.

14. A method for homogenizing the temperature of the outlet flow of a heat exchanger outlet in an engine bleed air system of an aircraft, the method comprising the steps of:
  providing a flow deflector according to claim 1 for acting on the outlet flow,
  locating said flow deflector at least in the cylindrical outlet duct.

* * * * *